Oct. 2, 1923.
O. CARROLL
TRANSMISSION LOCK
Filed March 31, 1922
1,469,620
3 Sheets-Sheet 2
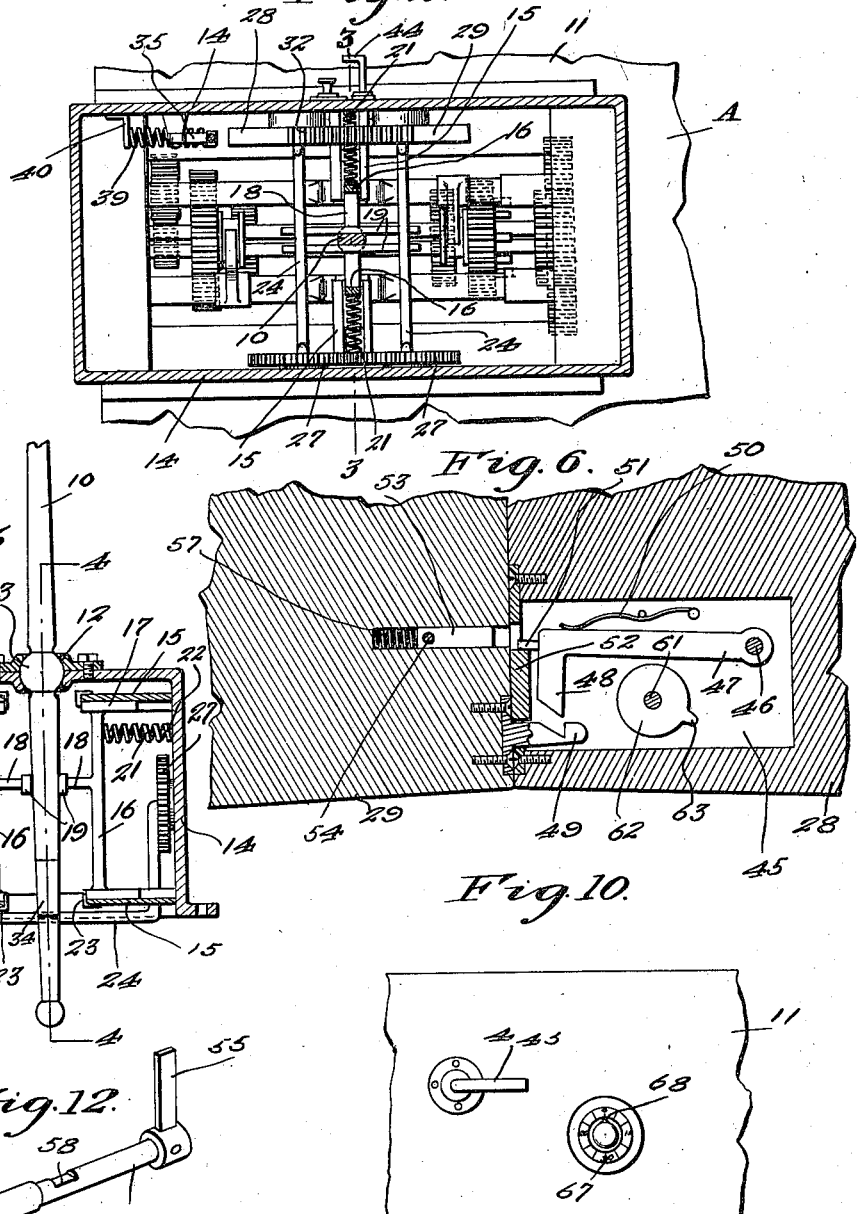
O. Carroll INVENTOR
BY Victor J. Evans ATTORNEY
WITNESSES
R. A. Thomas

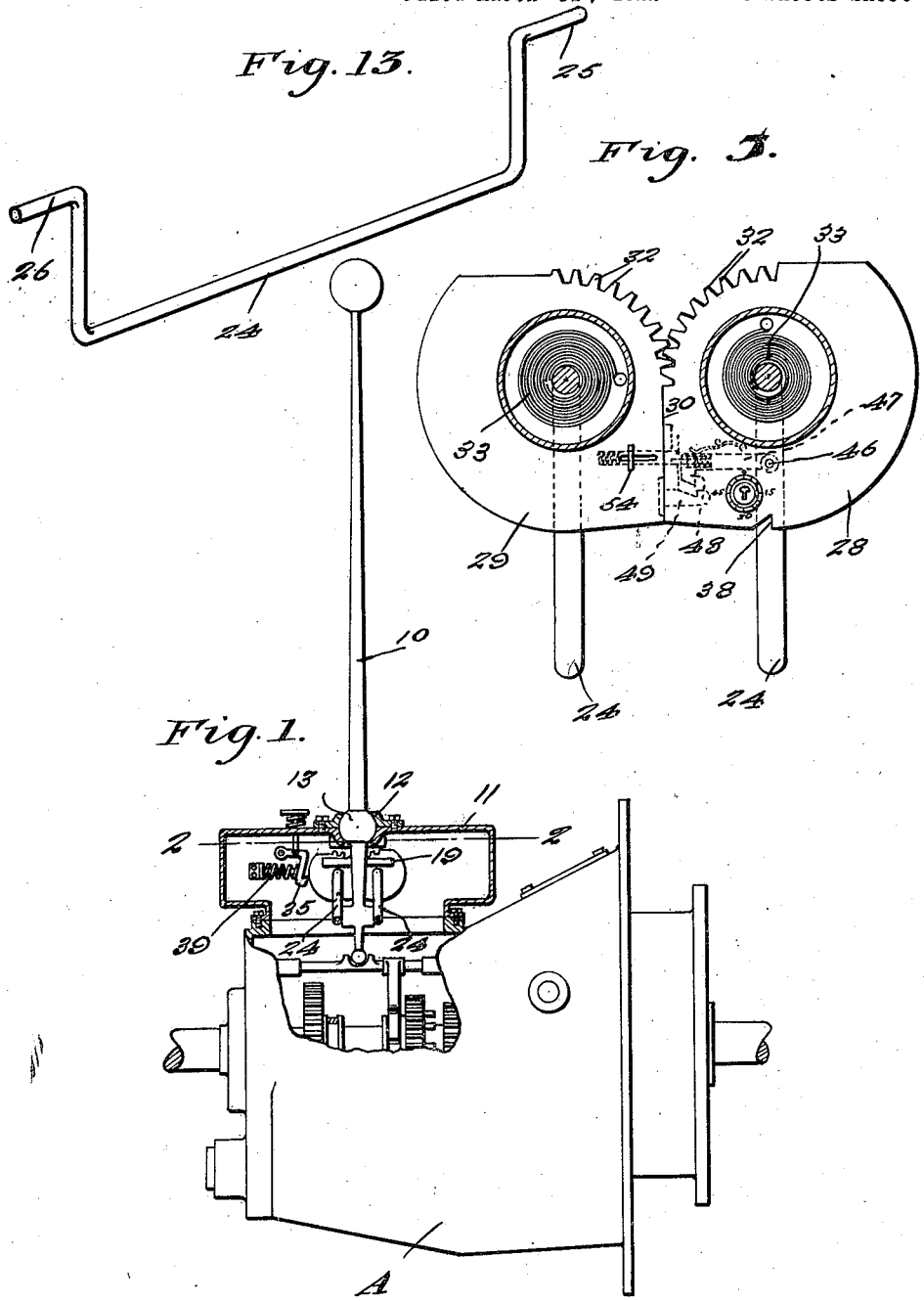

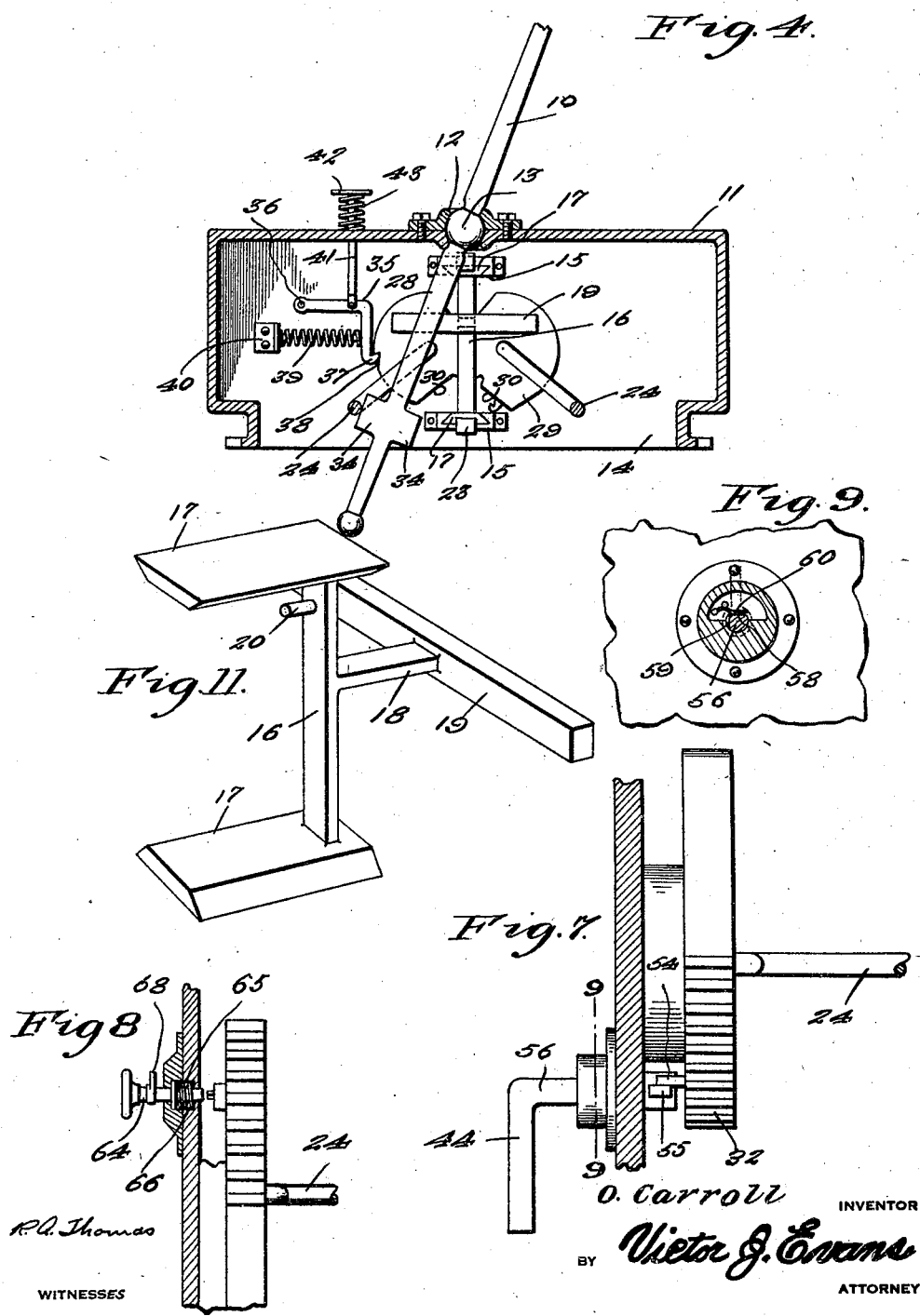

Patented Oct. 2, 1923.

1,469,620

UNITED STATES PATENT OFFICE.

ORLANDO CARROLL, OF CATONSVILLE, MARYLAND.

TRANSMISSION LOCK.

Application filed March 31, 1922. Serial No. 548,499.

*To all whom it may concern:*

Be it known that I, ORLANDO CARROLL, a citizen of the United States, residing at Catonsville, in the county of Baltimore and State of Maryland, have invented certain new and useful Improvements in Transmission Locks, of which the following is a specification.

This invention relates to automobile locks, and comprehends a construction of means whereby the gear shift lever may be locked in a neutral position, very quickly and conveniently, so that the car cannot be geared through the transmission; the mechanism being such that it can only be operated to release the gear shift lever by a successful manipulation of a combination lock, the combination being unknown to everyone except the owner of the vehicle.

One of the chief characteristics of the invention resides in the provision of means for automatically returning the gear shift lever from any one of its active positions to a neutral position, incident to the release of the means for this purpose, which does not in any way interfere with the proper shifting of the gears during the operation of the vehicle, but is only useful in returning the gear shift position as stated so that it can be subsequently locked in this position in an easy manner.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a side elevation of a transmission mechanism showing the arrangement of the device forming the subject matter of the present invention, this view being partly in section.

Figure 2 is a sectional view taken approximately on line 2—2 of Figure 1.

Figure 3 is a sectional view taken approximately on line 3—3 of Figure 2.

Figure 4 is a sectional view taken approximately on line 4—4 of Figure 3.

Figure 5 is an end elevation of the cooperating members which assist in turning the gear shift in a neutral position, and their associated segments.

Figure 6 is an enlarged fragmentary sectional view through the segments showing the relative positioning of the same just prior to locking them together.

Figure 7 is a sectional view through the casing showing the means for controlling the locking of the segments together.

Figure 8 is a somewhat similar view showing the spring pressed key of the combination lock and its relative position to one of the segments.

Figure 9 is a sectional view taken on line 9—9 of Figure 7.

Figure 10 is a fragmentary view taken at a right angle to Figure 7.

Figure 11 is a perspective view of one of the spring pressed members which also assist in returning the lever to a neutral position.

Figure 12 is a perspective view of the operating lever and its associated shaft.

Figure 13 is a detail view of one of the U-shaped members.

Referring to the drawings in detail, and particularly Figure 1, A indicates a transmission casing which houses a transmission mechanism of any well known construction, and which mechanism is controlled by the gear shift lever 10. Mounted upon the casing A is a casing 11 preferably of elongated formation in plan, and this casing 11 contains the mechanism forming the subject matter of the invention. The casing 11 is provided with a socket 12 which accommodates the ball 13 of the gear shift lever 10, and this lever is extended through the casing 11 for operative association with the transmission mechanism in the usual manner.

Projecting from each side 14 of this casing are spaced upper and lower guides 15, and these guides terminate an appreciable distance away from the gear shift lever 10 as illustrated in Figure 3. At each side of this lever is a member of the construction illustrated in Figure 11, and these members are designed to operate in a manner to be presently described, for the purpose of moving the gear shift lever automatically out of gear, and which members are assisted by other members to be hereinafter described, in returning the gear to neutral position. Each of the members that operate in the guides 15 comprises a vertical bar 16 which terminally supports slides 17, the latter being horizontally disposed to operate in the guides 15. Projecting centrally from the bar 16 is an arm 18 which supports a horizontally disposed bar 19, the latter being of a length sufficient to permit the gear shift lever to be actuated within the limits of its movements without moving beyond the terminals of this bar 19. Projecting from the bar 16 is a pin 20 which is received by one end of a coiled spring 21, the opposite end of the spring receiving a similar pin 22 projecting inwardly from the adjacent wall 14 of the casing. These springs function to hold the members just described normally in the position illustrated in Figure 3, wherein it will be noted that the horizontally disposed bars 19 will engage the gear shift lever 10 at the opposite sides thereof. Consequently, when the gear shift lever is actuated to put the car in gear, one or the other of these members is moved against the tension of its spring, so that the member will subsequently operate to assist in automatically returning the gear shift lever to normal position when it is desired to lock the lever in this position. The guides 15 are provided with stop flanges 23 which limit the movement of the slides 17 in one direction under the influence of the springs 21.

Now, also arranged within the casing 11 are substantially U-shaped members of the construction illustrated in Figure 13, and these members are arranged in advance and at the rear of the gear shift lever 10. Each of these members indicated at 24 terminate to provide offset extremities 25 and 26 respectively, and the corresponding extremities 25 of the respective members have associated therewith suitable gears 27 which are arranged to mesh with each other as illustrated in Figure 2. Carried by the other corresponding extremities 26 of these respective members 24 are segmental members 28 and 29 respectively. These members are formed to provide substantially flat or straight faces 30 which are arranged in contacting engagement with each other as illustrated in Figure 5, when the gear shift lever is locked in a manner to be hereinafter described. These members 28 and 29 are provided with teeth 32 which mesh with each other, so that the members are simultaneously moved toward and away from each other incident to the operation of the members 24. Surrounding the extremities 26 of these members and secured thereto are coiled springs 33 which when the members 24 are arranged in the position illustrated in Figure 4 are placed under tension, this being the position of these members, while the car is in use. The gear shift lever 10 is provided with extensions 34 which are disposed so that one or the other of these extensions engage one or the other of the members 24 to move the latter to the position illustrated in Figure 4, when the lever 10 is shifted in any direction to place the car in gear. As the segmental members 28 and 29 assume this position, they are held immovable in this position by means of a substantially L-shaped locking element 35 fulcrumed as at 36 and having an offset extremity 37 to be received within a notch 38 formed in the segmental member 28.

The locking element is normally under the pressure of a spring 39 which has one end associated with a bracket 40 secured to the casing 11. Also rising from the locking element 35 is a plunger rod 41 which passes through the casing and provided with a head or the like 42. Surrounding the plunger rod between the head 42 and the casing 11 is a coiled spring 43 which operates to normally hold the plunger elevated, and also assists the spring 39 in holding the said locking element 35 in an active position.

The operation of the construction thus far described is as follows:—

When the gear shift lever is operated in the usual manner, to place the car in gear, the lever is brought into contact with one or the other of the members 24, moving said member 24 against the tension of the spring associated therewith. Obviously, both of the members 24 are moved in unison to their connection by the segmental members 28 and 29, and when these members assume the position shown in Figure 4, they are held in this position by means of the locking element 35. Consequently, the gear shift lever is free of movement so that it can be utilized in the usual manner without any interference on part of the members 24. In addition to the members 24 being actuated by the gear shift lever as just stated, the members at the sides of the gear shift lever above described, and clearly illustrated in Figure 11, is also placed under tension, but these members are actuated independently of each other, depending of course upon which side of the longitudinal center of the transmission casing, the lever is arranged when the car is in gear. These members just referred to which include the bars 19 cannot in themselves automatically return the gear shift lever to a neutral position, as the lever must first be moved either forwardly or rearwardly, depending upon the way the car is geared by means of the members 24, before the members including the bars 19 can operate for the purpose stated. Of course, when the lever is actuated by hand to move it out of gear, the members arranged at the sides of the lever will assist in moving the lever to its neutral position. However, in order to lock the gear shift lever in a neutral position without touching the lever in any way, it is only necessary to depress the plunger rod 41 which moves the locking element 35 upon its fulcrum 36, out of engagement from the segmental member 28, and when this member is released, the springs 33 function to automatically move the gear shift lever in a direction necessary to return the lever to neutral position. It is for this purpose, that the members 24 are arranged at the front and rear of the lever. Then when the lever is shifted in the manner just stated, one of the members at the sides of the lever operates to return the lever to its neutral position. When the members 24 are released, incident to the depression of the plunger 41, the segmental members move into the position illustrated in Figure 5, wherein the faces 30 of the respective members contact each other. These members are then locked together in a manner to be presently described, so that the gear shift lever cannot thereafter be actuated to place the car in gear. It might be stated that this manner of returning the gear shift lever to neutral position without touching the lever is advantageous, where one is detained or stopped by a bandit, as the driver need only depress the plunger 41 and subsequently step upon the lever 44 to lock the gear shift lever in a neutral position, thus preventing the bandit from making use of the vehicle.

In order to lock the segmental members 28 and 29 together for the purpose just stated, I provide the member 28 with a recess 45 in which is pivoted as at 46 a locking element 47, the latter having an offset extremity 48 adapted to engage the keeper 49 which enters the recess 45 as the segmental members are brought together in the position shown in Figure 5. It is of course understood that the keeper 49 is carried by the segmental member 29. The locking element 47 is normally under the pressure of a spring 50 which is arranged within the recess 45 and bearing against the locking element. However, it is not always desirable to lock the members 28 and 29 together, as they assume the position illustrated in Figure 5, and for this purpose, I provide the locking element 47 with a spring pressed pin 51 which is normally projected beyond one end of the locking element to engage a stop 52, thus holding the locking element in an inactive position as shown in Figure 6. This pin 51 is however, forced within the locking element 47, to allow the said element to engage the keeper 49, by means of a spring pressed plunger 53 which slides in a bore formed in the member 29, and which bore opens into the recess 45 when the segmental members are arranged in face to face contact in a manner shown. Carried by the plunger 53 is a pin 54 which cooperates with an arm 55 fixed on a shaft 56 with which the lever 44 is associated. Consequently, when the members 28 and 29 move to the position illustrated in Figures 5 and 6, this arm 55 is disposed to engage the pin 54, to hold the plunger 53 retracted, thereby allowing the pin 51 to assume the position illustrated in Figure 6 for the purpose of holding the locking element in an inactive position. When it is desired to lock the members 28 and 29 together, the lever 44 is operated by the foot to turn the shaft 56, thus moving the arm 55 away from the pin 54, incident to which the plunger 53 is projected under the influence of the spring 57 into the recess 45, thereby moving the pin 51 within the locking element 47, allowing the said element to gravitate into operative association with the keeper 49. When the parts are thus locked together, they cannot be opened, without successfully manipulating a combination lock, the combination of which is only known to the owner or driver of vehicle. The shaft 56 is provided with adjacent flat surfaces 58 and 59 respectively, which surfaces are adapted to be alternately engaged by a leaf spring 60, so that the shaft is held in either of its adjusted positions. It is of course understood, that this shaft is only turned a quarter of a revolution for the purpose of moving the arm 55 away from the pin 54, or moving it to a position to contact said pin for the purpose stated.

The combination lock may be of any suitable construction, including a shaft 61 which supports a plurality of tumblers 62, within the recess 45, and these tumblers are formed with projections 63, so that when the tumblers are turned in proper order to bring the projections 63 into axial alinement, they contact the locking element 47, thereby elevating the latter and separating it from its keeper 49. There is one of these tumblers 62 illustrated in Figure 6, but as above stated, a number of such tumblers are used in well known combination lock mechanisms. The shaft 61 projects beyond the side of the segmental member 28, and is actuated by a key 64 which slides through the casing 11, this key being of hollow formation and having a cross sectional configuration similar to that of the adjacent extremity of the shaft 61. The key is normally held separated from this shaft through the instrumentality of a spring 65 which is positioned in the recess 66 and surrounding the key as illustrated in Figure 8. Arranged on the outside of the casing is a graduated dial 67, and cooperating with these graduations is a finger 68 carried by the key, so that the combination can be manipulated in the well known manner in order to lock the segments 28 and 29 respectively.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. An automobile lock comprising a casing receiving the gear shift lever, means arranged within the casing for automatically returning the said lever from an active to its neutral position, and means for locking the aforementioned means against movement, with the lever in its neutral position.

2. An automobile lock comprising a casing receiving the gear shift lever, means arranged within the casing for automatically returning the lever from an active to a neutral position, and a combination lock mechanism for locking said means against movement with the lever in neutral position.

3. An automobile lock comprising a casing receiving the gear shift lever, means arranged within the casing for automatically returning the lever from an active to a neutral position, means for holding the aforementioned means inactive to permit freedom of movement of said lever, foot operated means for releasing the first mentioned means for the purpose specified, and mechanism for locking the said first mentioned means against the movement with the lever in a neutral position.

4. An automobile lock comprising a casing supported by the transmission casing and receiving the gear shift lever, means operating within the casing for moving the lever from an active position to a neutral position, said means including spring pressed members arranged at the sides and also in advance and at the rear of the lever, two of said members operating in unison, the other of said members operating independently of each other, and means for locking the first mentioned members against movement with the lever in the neutral position.

5. An automobile lock comprising a casing supported by the transmission casing and receiving the gear shift lever, means arranged within said casing for automatically returning the lever from an active position to a neutral position, said means including members arranged at the sides of the lever, the members arranged in advance and at the rear of the lever, the latter mentioned members operating in unison, means for holding the latter mentioned members inactive to permit freedom of movement of the lever, means for releasing said members for the purpose specified, and means for locking said members against movement with the lever in a neutral position.

6. An automobile lock comprising a casing receiving the gear shift lever, means operating within the casing for automatically returning the gear shift lever from an active to a neutral position, means for holding the aforementioned means inactive to permit freedom of movement of said lever, foot operated means for releasing the first mentioned means for the purpose specified, means for locking the first mentioned means against movement with the lever in a neutral position, and the last mentioned means including a foot operated lever.

In testimony whereof I affix my signature.

ORLANDO CARROLL.